United States Patent
Minor et al.

(10) Patent No.: US 7,763,326 B2
(45) Date of Patent: Jul. 27, 2010

(54) PHOTOCURABLE MASKANT COMPOSITION AND METHOD OF USE

(75) Inventors: Michael J. Minor, Arlington, TX (US); Jason E. Huxol, Mansfield, TX (US)

(73) Assignee: United Technologies Corporation, Hartford, CT (US)

( * ) Notice: Subject to any disclaimer, the term of this patent is extended or adjusted under 35 U.S.C. 154(b) by 884 days.

(21) Appl. No.: 11/642,424

(22) Filed: Dec. 20, 2006

(65) Prior Publication Data

US 2008/0152831 A1 Jun. 26, 2008

(51) Int. Cl.
*C08J 7/04* (2006.01)
*G03C 1/00* (2006.01)
*C08K 3/08* (2006.01)

(52) U.S. Cl. .......................... 427/504; 427/510; 522/81

(58) Field of Classification Search ................... 522/81, 522/83; 427/510, 504
See application file for complete search history.

(56) References Cited

U.S. PATENT DOCUMENTS

| | | | |
|---|---|---|---|
| 4,548,862 A | 10/1985 | Hartman | |
| 4,999,136 A | 3/1991 | Su et al. | |
| 6,027,630 A * | 2/2000 | Cohen | 205/135 |
| 6,326,057 B1 | 12/2001 | Das et al. | |
| 6,458,473 B1 * | 10/2002 | Conner et al. | 428/623 |
| 6,544,665 B2 * | 4/2003 | Rigney et al. | 428/633 |
| 6,607,789 B1 * | 8/2003 | Rigney et al. | 427/454 |
| 6,689,422 B1 * | 2/2004 | Warnes et al. | 427/255.11 |
| 6,858,480 B2 * | 2/2005 | Nakamura et al. | 438/162 |
| 6,905,730 B2 | 6/2005 | Ackerman et al. | |
| 7,122,224 B2 * | 10/2006 | Das et al. | 427/282 |
| 2005/0266266 A1 | 12/2005 | Rigney et al. | |
| 2006/0046091 A1 | 3/2006 | Madhava et al. | |
| 2006/0141158 A1 | 6/2006 | Das et al. | |
| 2006/0216415 A1 | 9/2006 | Olson et al. | |
| 2006/0216422 A1 | 9/2006 | Das et al. | |
| 2006/0222776 A1 | 10/2006 | Madhava et al. | |

FOREIGN PATENT DOCUMENTS

| | | |
|---|---|---|
| EP | 1365039 | 11/2003 |
| EP | 1387040 | 2/2004 |
| JP | 2007-314390 | 12/2007 |
| WO | WO03000816 | 1/2003 |

OTHER PUBLICATIONS

European Search Report—EP 07 25 4821—dated May 16, 2008.
Golebiewski, R., "Environmentally Safe, UV Curable Masking Resins Reduce Aircraft Component Processing Costs," as presented at The Aerospace/Airline Plating Forum & Exposition, Aug. 2002.

* cited by examiner

*Primary Examiner*—Susan W Berman
(74) *Attorney, Agent, or Firm*—Kinney & Lange, P.A.

(57) ABSTRACT

A maskant composition and a method of diffusion coating a metal component with the use of the maskant composition, where the maskant composition comprises a cross-linkable resin, a photoinitiator, and a gettering agent.

11 Claims, 2 Drawing Sheets

PHOTOCURABLE MASKANT COMPOSITION AND METHOD OF USE

BACKGROUND OF THE INVENTION

The present invention relates to diffusion coating processes. In particular, the present invention relates to maskant films used to mask underlying metal components during diffusion coating processes.

Diffusion coating processes, such as diffusion aluminide coating processes, are used to apply protective coatings over metal components in a variety of industries. For example, turbine engine components are typically diffusion coated with aluminum-based alloys to form aluminide coatings, where the aluminide coatings protect the underlying engine components from oxidation and other environmental elements. During a diffusion coating process, it is desirable to selectively coat portions of a metal component, while allowing other portions to remain uncoated. One technique for selectively coating a metal component involves the use of a maskant film, which is applied over a desired location. After the maskant is applied, the diffusion coating process is then performed to form diffusion coatings (e.g., aluminide coatings) over the exposed portions of the metal component.

Many industries require rapid throughputs of metal components to meet consumer demands. As such, it is desirable to quickly perform the diffusion coating processes. However, after being applied to a metal component, a solvent-based maskant film typically requires a substantial period of time to solidify (e.g., 30 minutes to 24 hours) before the diffusion coating process can commence. This delay in the formation of the maskant film substantially reduces the throughput of metal components. As such, there is a need for maskant films that may be applied rapidly to increase throughputs of diffusion coating processes.

BRIEF SUMMARY OF THE INVENTION

The present invention relates to a photocurable maskant composition and a method of diffusion coating a metal component with the use of the photocurable maskant composition. The maskant composition includes a cross-linkable resin, a photoinitiator, and a gettering agent.

DETAILED DESCRIPTION

Figure 1:
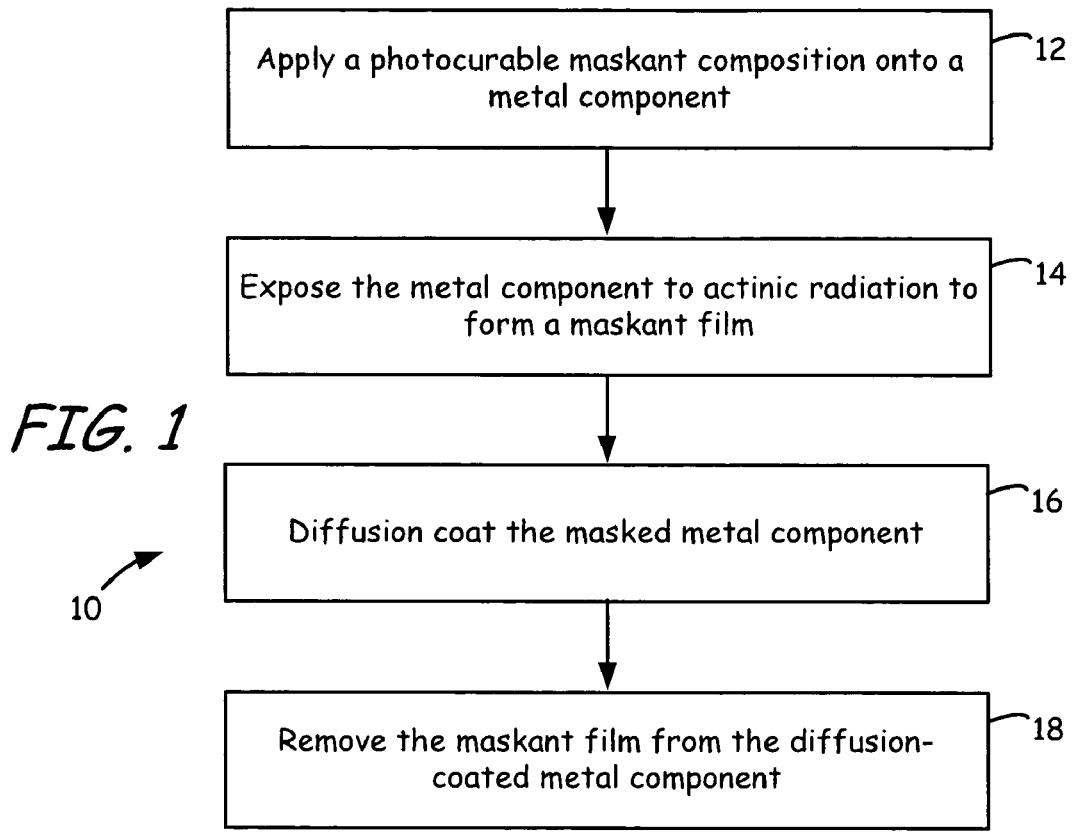
FIG. 1 is a flow diagram of a method for diffusion coating a metal component with the use of a photocurable maskant composition.

FIG. 1 is a flow diagram of method 10 for diffusion coating a metal component with the use of a photocurable maskant composition. As shown, method 10 includes steps 12-18, and initially involves applying the maskant composition onto the metal component (step 12). The maskant composition functions as maskant film that prevents diffusion coatings from being formed on one or more portions of the metal component. Accordingly, the maskant composition is desirably applied over the portions of the metal component that are intended to remain uncoated after the diffusion coating process.

The maskant composition includes a cross-linkable resin, a photoinitiator, and a gettering agent, where the gettering agent is desirably provided in a sufficient quantity to mask an underlying surface of the metal component. The concentration of the gettering agent is also proportional to the viscosity of the maskant composition. As a result, the technique used to apply the maskant composition to the metal component may vary depending on the compositional viscosity. Suitable techniques for applying the maskant composition include dip coating, paint coating, extrusion coating, and combinations thereof.

Once the maskant composition is applied to the metal component, the metal component is then exposed to actinic radiation (step 14). The actinic radiation cures (i.e., cross-links) the maskant composition to form a maskant film over the coated portions of the metal component. Examples of suitable types of actinic radiation for curing the maskant composition include radiation having wavelengths ranging from gamma-rays to ultraviolet (UV) wavelengths (e.g., gamma, x-ray, and UV), electron beam radiation, and combinations thereof. Examples of particularly suitable types of actinic radiation include UV-wavelength radiation.

The actinic radiation is emitted from a radiation source (e.g., a UV lamp) having sufficient intensity, and for a sufficient duration, to at least partially cross-link the maskant composition. Preferably, the intensity and duration are sufficient to substantially or fully cross-link the maskant composition. In contrast to solvent-based maskants, the photocuring reaction occurs rapidly, thereby substantially reducing the time required to form a cured maskant film on the metal component (e.g., less than one minute). This correspondingly decreases the time required to perform a diffusion coating process, which may increase the throughput of metal components.

The particles of the gettering agent reduce the penetration of the actinic radiation within the maskant composition. This is in contrast to solvent-based maskants, which typically are not dependent on radiation penetration within the composition. Accordingly, the concentration of the gettering agent, in the maskant composition is desirably balanced to provide both good masking capabilities and good curing efficiencies. Suitable concentrations of the gettering agent in the maskant composition range from about 15% by weight to about 85% by weight, with particularly suitable concentrations ranging from about 60% to about 80%, based on the entire weight of the maskant composition. Such concentrations are suitable for masking an underlying surface of the metal component, while also allowing sufficient photocuring of the cross-linkable resin.

In one embodiment, the particles of the gettering agent are dispersed in a substantially uniform manner throughout the cross-linkable resin. This reduces the risk of forming particle agglomerates, which may also reduce cross-linking efficiencies. The density of the particles in the maskant composition is based on the concentration of the gettering agent and the level of dispersion in the cross-linkable resin. Examples of suitable densities of the gettering agent particles in the maskant composition range from about 5% by weight to about 85% by weight.

Curing the cross-linkable resin forms a matrix of the cross-linked resin, which hardens the cured maskant film (compared to the uncured maskant composition). The gettering agent is dispersed within the solidified matrix, which allows the gettering agent to attract diffusion-coating materials (e.g., aluminide materials) that are applied to the metal component during a diffusion coating process. In one embodiment, the gettering agent is dispersed within the solidified matrix in a substantially uniform manner, which increases the consistency of attracting diffusion-coating materials.

The masked metal component is then diffusion coated to form a diffusion coating over the masked metal component (step 16). Examples of suitable diffusion coating processes include pack-cementation processes and vapor-phase processes. A suitable pack-cementation process involves placing the masked metal component in a sealed retort containing a powder mixture, where the powder mixture includes a source of the diffusion-coating material, a halide activator, and an inert filler (e.g., aluminum oxide). Examples of suitable diffusion-coating materials include aluminum-based materials, chrome-based materials, and silicon-based materials, with particularly suitable diffusion-coating materials including aluminum-based materials (e.g., aluminides).

The retort containing the masked metal component is then heated in a furnace, which causes the coating materials to react with the halide activators to form gaseous metal-halide compounds (e.g., aluminum-halide compounds). Suitable temperatures for initiating the reaction range from about 650° C. (about 1200° F.) to about 1100° C. (about 2000° F.). The high temperatures may also burn off one or more portions of the organic cross-linked matrix. However, the residual portions retain the gettering agent particles, thereby providing a barrier against the gaseous metal-halide compounds.

The gaseous metal-halide compounds decompose at the surface of the masked metal component, and at the surfaces of the gettering agent particles of the maskant film, thereby depositing the diffusion coating on the surface of the metal component and the gettering agent particles of the maskant film. The deposition of the diffusion coating correspondingly releases the halide activator to form additional gaseous metal-halide compounds while the source of the diffusion-coating material is still available. Because the gettering agent particles decompose the gaseous metal-halide compounds that deposit onto the maskant film, the maskant film correspondingly prevents the diffusion coating from forming on the underlying surface of the metal component.

Once the coating operation is completed, the metal component is removed from the retort, and the maskant film is removed from the diffusion-coated metal component (step 18). The maskant film may be removed in a variety of manners, such as peeling or scraping the maskant film depending on the adhesive strength between the maskant film and the surface of the metal component. Once the maskant film is removed, the resulting diffusion-coated metal component has the diffusion coating disposed over the non-masked portions of the metal component, and the masked portions are substantially free of the diffusion coating.

Figure 2:
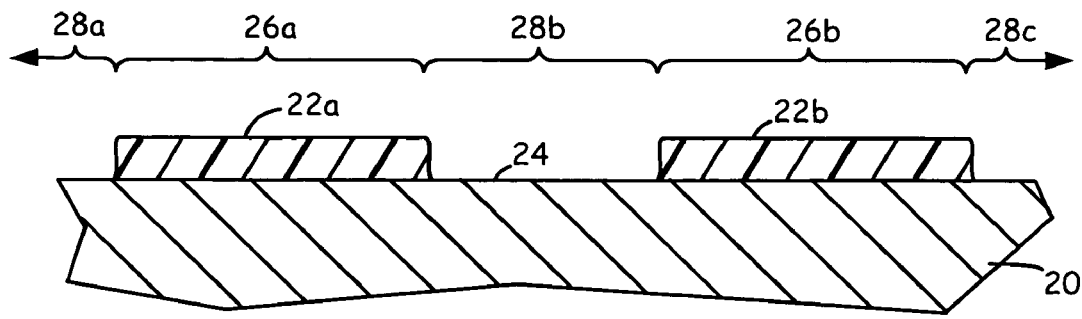
FIGS. 2-4 are sectional views of a metal component, which illustrate the method of diffusion coating the metal component with the use of the photocurable maskant composition.
Figure 3:
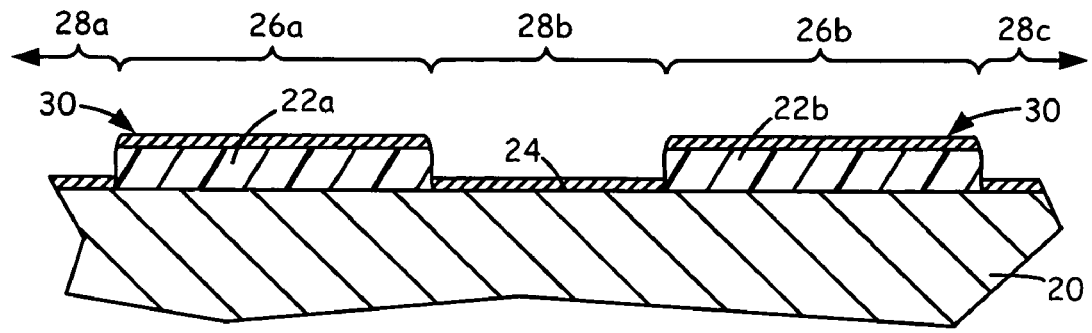
Figure 4:
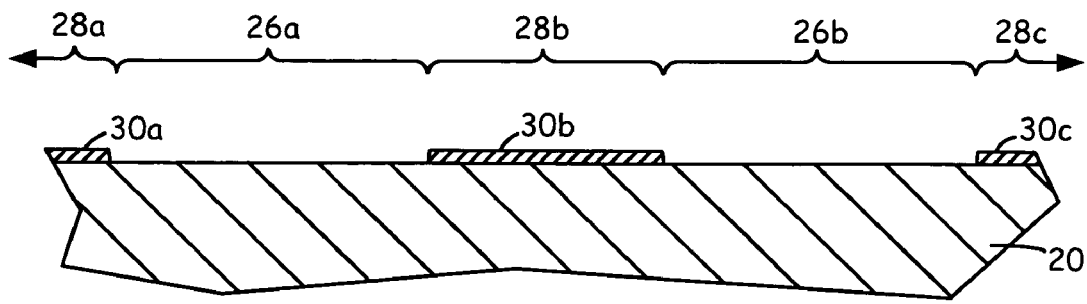

FIGS. 2-4 are sectional views of metal component 20, which is an example of a suitable metal component undergoing a diffusion coating process pursuant to method 10 (shown in FIG. 1). FIG. 2 shows metal component 20 coated with film segments 22a and 22b. Metal component 20 is a component composed of an alloy (e.g., nickel and cobalt-based alloys), such as a turbine engine component, and includes surface 24. Film segments 22a and 22b are coatings of a photocurable maskant composition, which are applied and cross-linked pursuant to steps 12 and 14 of method 10. As discussed above, the use of photoinitiated cross-linking substantially decreases the time required to apply film segments 22a and 22b, thereby allowing metal component 20 to be diffusion coated shortly after the maskant composition is applied.

The maskant composition is applied to portions of surface 24 that are intended to remain uncoated. Accordingly, surface 24 is divided into masked portions 26a and 26b, and exposed portions 28a, 28b, and 28c, where masked portions 26a and 26b are the portions of surface 24 respectively covered by film segments 22a and 22b, and exposed portions 28a, 28b, and 28c are the portions of surface 24 that are not covered by film segments 22a or 22b.

The maskant composition is desirably applied with a layer thickness that is sufficient for preventing the gaseous metal-halide compounds from penetrating film segments 22a and 22b. Suitable layer thicknesses for the maskant films (e.g., film segments 22a and 22b) range from about 250 micrometers (about 10 mils) to about 5,000 micrometers (about 200 mils), with particularly suitable thicknesses ranging from about 1900 micrometers (about 75 mils) to about 3,200 micrometers (about 125 mils). As discussed above, the gettering agent is desirably provided in a quantity that allows sufficient photocuring of the cross-linkable resin. Accordingly, the concentration of the gettering agent in the maskant composition desirably allows a cure depth through a maskant film that is at least as deep as the layer thickness of the maskant film.

While film segments 22a and 22b are each shown as single film segments, the maskant composition may be applied to surface 24 to define a variety of different masking patterns as individual needs may necessitate. For example, during airfoil coating operations, the ribbed structures of airfoil roots may be coated with the maskant composition of the present invention, thereby masking the roots while the airfoil blades are diffusion coated.

As shown in FIG. 3, after film segments 22a and 22b are applied, diffusion coating 30 is then formed over film segments 22a and 22b, and over exposed portions 28a, 28b, and 28c of surface 24, pursuant to step 16 of method 10. As shown, film segments 22a and 22b prevent diffusion coating 30 from being formed on the surface of metal component 20 beneath masked portions 26a and 26b, respectively.

FIG. 4 shows metal component 20 after film segments 22a and 22b (shown in FIGS. 2 and 3) are removed, pursuant to step 18 of method 10. After film segments 22a and 22b are removed, the resulting metal component 20 includes diffusion coating segments 30a, 30b, and 30c disposed over surface 24 at exposed portions 28a, 28b, and 28c, respectively. Correspondingly, masked portions 26a and 26b are substantially free of the diffusion coating material.

As discussed above, the maskant composition includes a cross-linkable resin, a photoinitiator, and a gettering agent, where the photoinitiator and the gettering agent are desirably dispersed in the maskant composition. The cross-linkable resin used in the maskant composition includes one or more polymerizable precursors having one or more radiation-curable moieties. Such precursors include polymerizable monomers, oligomers, macromonomers, polymers, and combinations thereof. The term "radiation-curable moiety" refers to a functionality that is directly or indirectly pendant from the backbone (e.g., side-pendant groups and chain-ending groups) and that reacts (i.e., cross-links) upon exposure to a suitable source of actinic radiation.

Suitable radiation-curable moieties for the polymerizable precursor include epoxy groups, (meth)acrylate groups (acryl and methacryl groups), olefinic carbon-carbon double bonds, allyloxy groups, alpha-methyl styrene groups, (meth)acrylamide groups, cyanate ester groups, vinyl ethers groups, and combinations thereof. The polymerizable precursor may be monofunctional or multifunctional (e.g., di-, tri-, and tetra-) in terms of radiation-curable moieties. Examples of suitable commercially available cross-linkable resins include those under the trademark "DYMAX SPEEDMASK" UV-Curable Masking Resins from Dymax Corporation, Torrington, Conn. Suitable concentrations of the cross-linkable resin in the maskant composition range from about 15% by weight to about 85% by weight, with particularly suitable concentrations ranging from about 20% by weight to about 40% by weight, based on the entire weight of the maskant composition.

The type of photoinitiator used in the maskant composition depends on the polymerizable precursor used and on the wavelength of the actinic radiation used to cure the polymerizable precursor. Examples of suitable free-radical-generating photoinitiators include benzoins (e.g., benzoin alkyl ethers), acetophenones (e.g., dialkoxyacetophenones, dichloroacetophenones, and trichloroacetophenones), benzils (e.g., benzil ketals, quinones, and O-acylated-α-oximinoketones). Examples of suitable cationic-generating photoinitiators include onium salts, diaryliodonium salts of sulfonic acids, triarylsulfonium salts of sulfonic acids, diaryliodonium salts of boronic acids, and triarylsulfonium salts of boronic acids. Suitable concentrations of the photoinitiator in the maskant composition range from about 1% by weight to about 10% by weight, with particularly suitable concentrations ranging from about 2% by weight to about 5% by weight, based on the entire weight of the maskant composition.

The gettering agent used in the maskant composition is a compound suitable for attracting and decomposing a gaseous metal-halide compound (e.g., an aluminum halide) used to diffusion coat the metal component. Examples of suitable gettering agents for use in the maskant composition include nickel, nickel-based alloys, chrome, chrome-based alloys, and alloys thereof. Examples of suitable commercially available gettering agents include those under the trade designations "M1 Maskant", "M7 Maskant", "M8 Maskant", and "M10 Maskant" from APV Engineered Coatings, Akron, Ohio. The gettering agent may be provided in a powder form in which the powder particles desirably have average particle sizes ranging from about 1 micrometer micrometers to about 75 micrometers, with particularly suitable average particle sizes ranging from about 10 micrometers to about 50 micrometers.

The maskant composition may also include additional additives, such as heat stabilizers, UV-light stabilizers, free-radical scavengers (e.g., hindered amine light stabilizer compounds), dyes, pigments, surfactants, plasticizers, rheology-modifying agents, film-forming agents, opacity-modifying agents, and combinations thereof. Suitable concentrations of the additional additives in the radiation-curable material range from about 0.01% by weight to about 5% by weight, with particularly suitable total concentrations ranging from about 0.1% by weight to about 2% by weight, based on the entire weight of the maskant composition.

In one embodiment, the maskant composition is substantially free of volatile solvents, such as aromatic solvents, alcohols, ketones, and the like. Volatile solvents are typically used with solvent-based maskants, where the maskants polymerize upon evaporation of the solvent. In contrast, the maskant composition of the present invention is photocurable, and does not require the use of a solvent. This is particularly beneficial with respect to volatile organic solvents, which are potential environmental hazards.

Although the present invention has been described with reference to preferred embodiments, workers skilled in the art will recognize that changes may be made in form and detail without departing from the spirit and scope of the invention.

The invention claimed is:

1. A method for coating a metal component, the method comprising:
    applying a maskant composition over at least a portion of the metal component, the maskant composition comprising a cross-linkable resin, a photoinitiator, and a gettering agent selected from the group consisting of nickel, nickel-based alloys, chrome, chrome-based alloys, and alloys thereof;
    exposing the maskant composition to actinic radiation, thereby at least partially cross-linking the maskant composition to form a maskant film; and
    diffusion coating at least a portion of the metal component and the maskant film.

2. The method of claim 1, wherein the actinic radiation is selected from the group consisting of gamma-ray wavelength radiation, x-ray wavelength radiation, ultraviolet wavelength radiation, electron beam radiation, and combinations thereof.

3. The method of claim 1, wherein the cross-linkable resin is present in an amount ranging from about 15% by weight to about 85% by weight, based on an entire weight of the maskant composition.

4. The method of claim 1, wherein the cross-linkable resin comprises a polymerizable precursor having one or more radiation-curable moieties selected from the group consisting of epoxy groups, (meth)acrylate groups, olefinic carbon-carbon double bonds, allyloxy groups, alpha-methyl styrene groups, (meth)acrylamide groups, cyanate ester groups, vinyl ethers groups, and combinations thereof.

5. The method of claim 1, wherein the photoinitiator is present in an amount ranging from about 1% by weight to about 10% by weight, based on an entire weight of the maskant composition.

6. The method of claim 1, wherein the gettering agent is present in an amount ranging from about 15% by weight to about 85% by weight, based on an entire weight of the maskant composition.

7. A method for coating a metal component, the method comprising:
    applying a photocurable maskant composition over at least a portion of the metal component, the photocurable maskant composition comprising:
        a polymerizable precursor having at least one radiation-curable moiety;
        a photoinitiator dispersed in photocurable maskant composition, and configured to initiate a cross-linking reaction of the polymerizable precursor; and
        a gettering agent selected from the group consisting of nickel, nickel-based alloys, chrome, chrome-based alloys, and alloys thereof dispersed in photocurable maskant composition,
    exposing the photocurable maskant composition to actinic radiation, thereby cross-linking the polymerizable precursor to at least partially form a cross-linked matrix, wherein the gettering agent is substantially dispersed in the cross-linked matrix; and
    diffusion coating at least a portion of the metal component and the cross-linked matrix.

8. The method of claim 7, wherein the actinic radiation is selected from the group consisting of gamma-ray wavelength radiation, x-ray wavelength radiation, ultraviolet wavelength radiation, electron beam radiation, and combinations thereof.

9. The method of claim 7, wherein the cross-linkable resin is present in an amount ranging from about 15% by weight to about 85% by weight, based on an entire weight of the maskant composition.

10. The method of claim 7, wherein the polymerizable precursor has one or more radiation-curable moieties selected from the group consisting of epoxy groups, (meth)acrylate groups, olefinic carbon-carbon double bonds, allyloxy groups, alpha-methyl styrene groups, (meth)acrylamide groups, cyanate ester groups, vinyl ethers groups, and combinations thereof.

11. The method of claim 7, wherein the gettering agent is present in an amount ranging from about 15% by weight to about 85% by weight, based on an entire weight of the photocurable maskant composition.

* * * * *